UNITED STATES PATENT OFFICE.

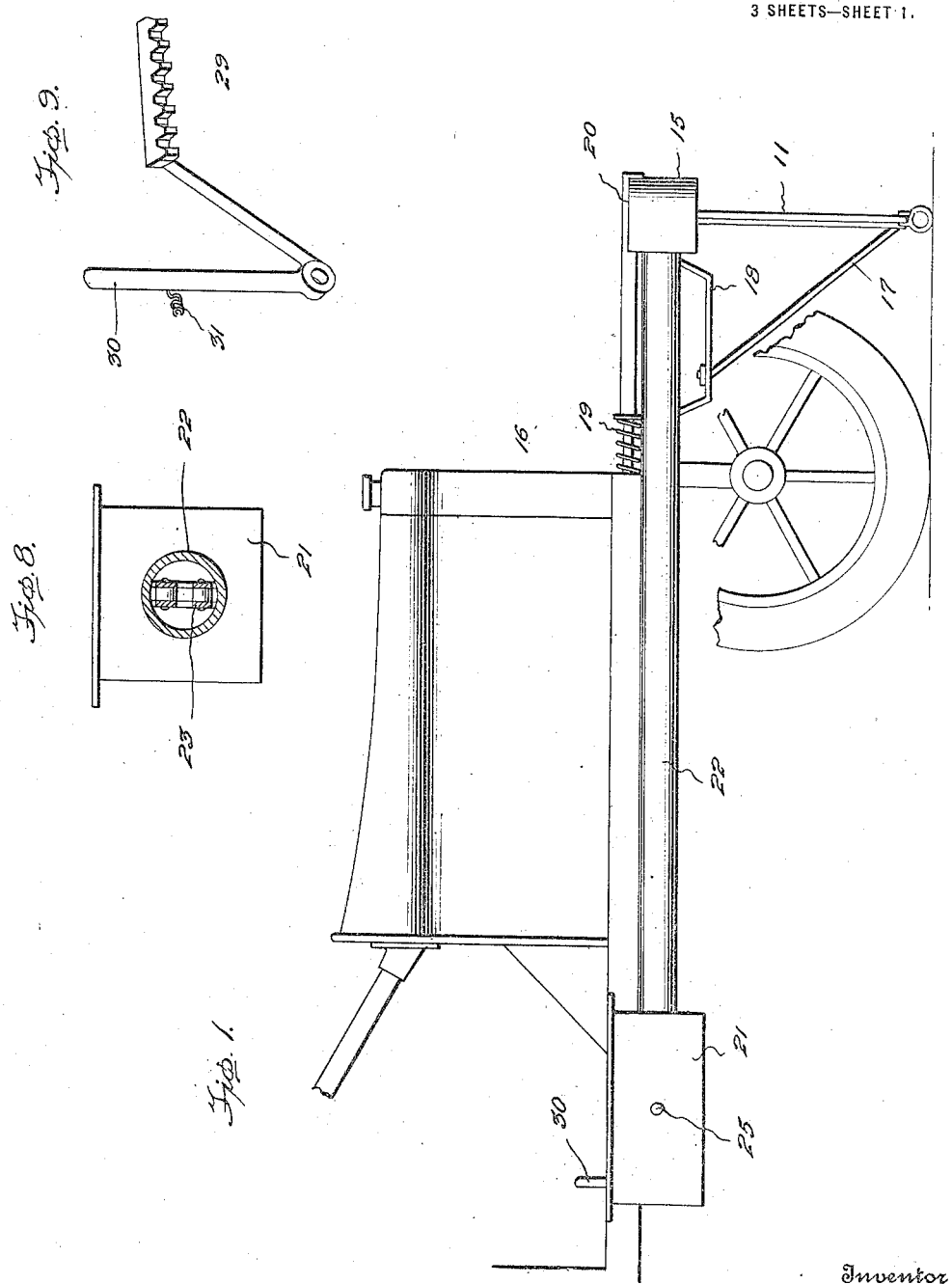

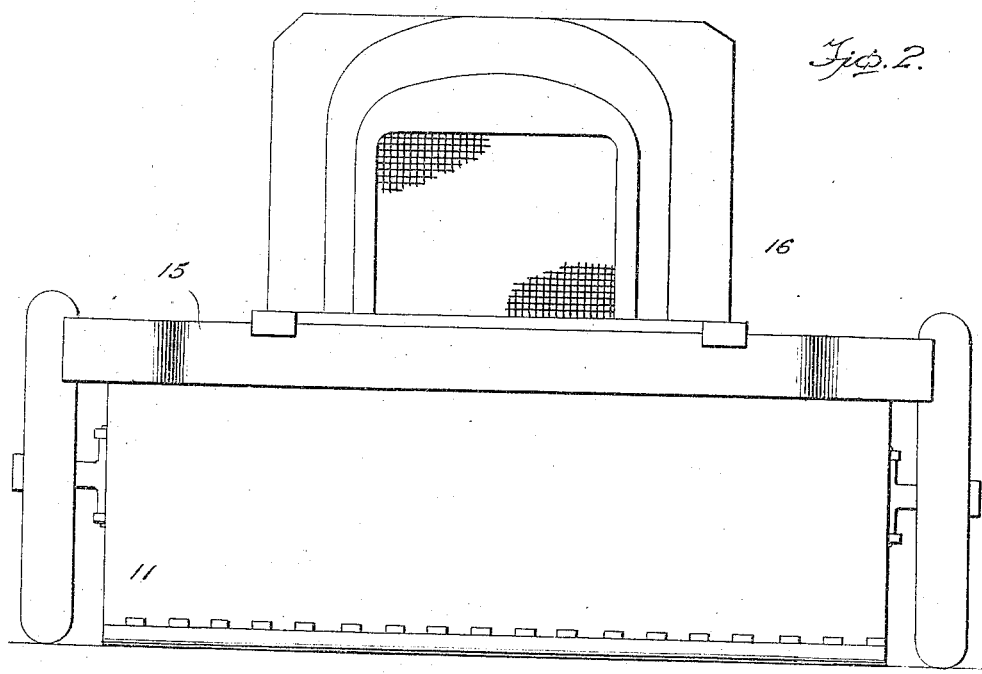
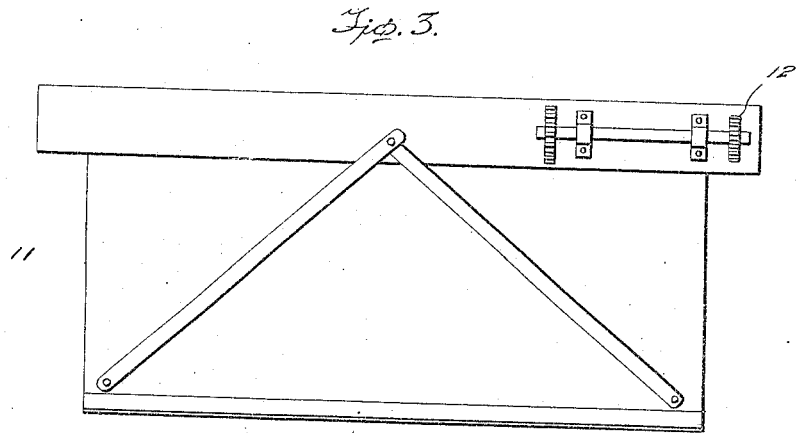

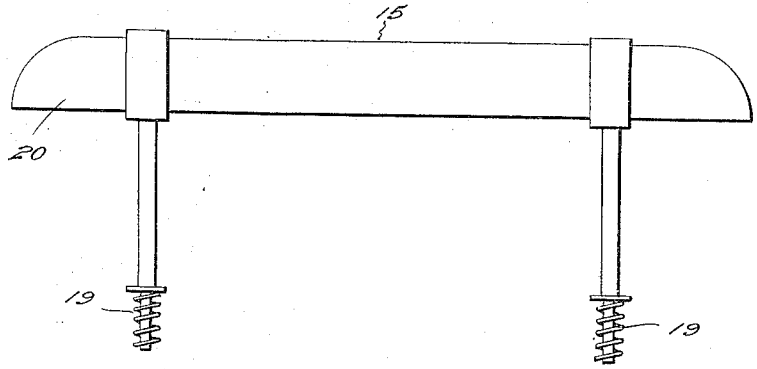
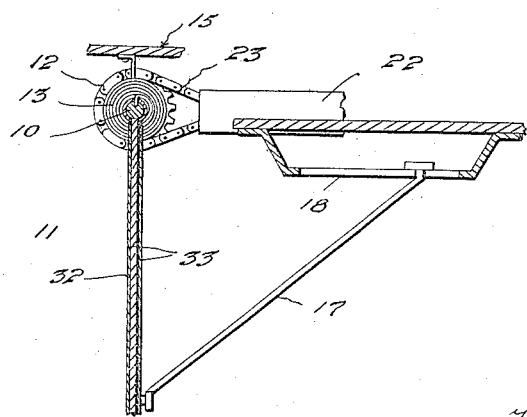
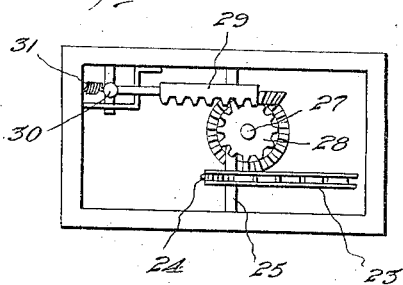
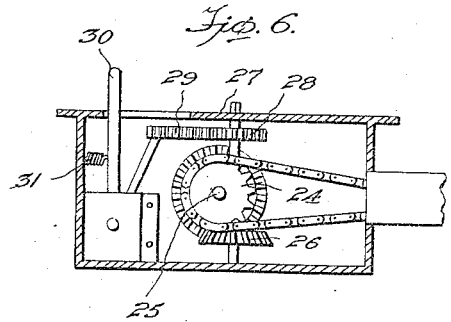

PATRICK ANGELILLO, OF VAUDREUIL STATION, QUEBEC, CANADA.

AUTOMOBILE-FENDER.

1,240,004.    Specification of Letters Patent.    Patented Sept. 11, 1917.

Application filed May 26, 1916, Serial No. 100,174. Renewed February 13, 1917. Serial No. 148,414.

*To all whom it may concern:*

Be it known that I, PATRICK ANGELILLO, a subject of the King of Great Britain, residing at Vaudreuil Station, in the Province of Quebec, Dominion of Canada, have invented certain useful Improvements in Automobile-Fenders, of which the following is a specification, reference being had therein to the accompanying drawings.

This invention relates to improvements in automobile fenders, one object of the invention being the provision of a manually controlled device operated from the seat of the motor car for placing the fender in protecting relative position to the forward portion of the car, a novel mechanism being devised for moving the same into and out of such position.

A further object of this invention is the provision of a simple, durable and inexpensive device of this character which is readily installed upon motor cars and which is thoroughly efficient and practical in use.

In the accompanying drawings,

Figure 1 is a side elevation of the forward portion of a motor car equipped with the present invention. Fig. 2 is a front elevation thereof.

Fig. 3 is a rear elevation of the guard *per se.*

Fig. 4 is a top plan view thereof.

Fig. 5 is a fragmentary vertical sectional view through the fender or guard and the adjunct coöperative parts thereof.

Fig. 6 is a fragmentary vertical longitudinal sectional view through the casing having therein the foot operated bell crank lever.

Fig. 7 is a plan view of the structure shown in Fig. 6.

Fig. 8 is a vertical transverse sectional view taken immediately forwardly of the casing shown in Figs. 6 and 7.

Fig. 9 is a perspective view of the bell crank lever and toothed rack.

Referring to the drawings, the numeral 10 designates a shaft which carries thereon the fender or guard 11, there being fast to said shaft upon one of the ends thereof the sprocket 12, while on the opposite end is connected the spring 13 which normally holds the fender elevated.

The shaft 10 is journaled in the shock absorbing frame 15 mounted at the forward portion of the motor car chassis 16. The two bars 17 are each connected at its lower end to the rear of the fender or guard and extends inclinedly upwardly and is slidably mounted in the bracket or frame 18 and is cushioned by the spring 19 therein. The shaft 10 is journaled and incased within a cover or casing 20 supported upon the forward end of the motor car.

Mounted parallel with the chassis and extending from the forward end to a second casing 21 is a pipe casing 22 in which passes the endless sprocket chain 23, the same being trained over the sprocket aforementioned and over the sprocket 24 journaled in the casing 21 and upon the shaft 25. The shaft 25 is provided with a beveled pinion 26 mounted upon a vertical shaft 27 which carries at its upper end a gear 28 controlled by the toothed segment 29 actuated by the foot operated bell crank lever 30 which is mounted in the casing 21 and in ready access to the foot of the operator. A spring 31 is provided to normally return the bell crank lever.

It will thus be seen that upon the depression of the bell crank lever, that the sprocket chain and sprockets will operate to move the fender in opposition to its spring and thus dispose the fender in a vertical position to receive any object that may fall in front of the motor car, the bars with their cushioning means which brace the lower end of the fender coöperating to absorb the shock when such an object is struck.

The fender proper is made of a body 32 which is preferably made of metal, either sheet iron or aluminum, according to the weight of the car or the truck upon which the fender is used, a cover of fabric 33 being carried thereby.

What I claim as new is:—

1. In a motor car fender, the combination of a supporting case for attachment to a motor car, a shaft journaled therein for oscillation, a fender apron carried by said shaft, a spring connected to said shaft for holding the fender normally in one position, a sprocket connected to said shaft, a sprocket chain connected to said sprocket and extending rearwardly, a second sprocket journaled to receive the sprocket chain, a foot actuated means for operating this sprocket to move the fender apron in opposition to its spring.

2. In a motor car fender, the combination of a supporting casing for attachment to a motor car, a shaft journaled therein for oscillation, a fender apron carried by said shaft, a spring connected to said shaft for holding the fender normally in one position, a sprocket connected to said shaft, a sprocket chain connected to said sprocket and extending rearwardly, a second sprocket journaled to receive the sprocket chain, a foot actuated means for operating this sprocket to move the fender apron in opposition to its spring and a pair of brace rods connected to the lower end of the fender apron and to the motor car chassis.

3. In a motor car fender, the combination of a supporting casing for attachment to a motor car, a shaft journaled therein for oscillation, a fender apron carried by said shaft, a spring connected to said shaft for holding the fender normally in one position, a sprocket connected to said shaft, a sprocket chain connected to said sprocket, and extending rearwardly, a second sprocket journaled to receive the sprocket chain, a foot actuated means for operating this sprocket to move the fender apron in opposition to its spring, and a pipe mounted alongside of the motor car frame and through which the sprocket chain passes.

4. In a motor car fender, the combination of a supporting casing for attachment to a motor car, a shaft journaled therein for oscillation, a fender apron carried by said shaft, a spring connected to said shaft for holding the fender normally in one position, a sprocket connected to said shaft, a sprocket chain connected to said sprocket and extending rearwardly, a second sprocket journaled to receive the sprocket chain, a foot actuated means for operating this sprocket to move the fender apron in opposition to its spring, a pair of brace rods connected to the lower end of the fender apron and to the motor car chassis, and a pipe mounted alongside of the motor car frame and through which the sprocket chain passes.

In testimony whereof I affix my signature.

PATRICK ANGELILLO.

Copies of this patent may be obtained for five cents each, by addressing the "Commissioner of Patents, Washington, D. C."